United States Patent
Kojima et al.

(10) Patent No.: US 7,893,340 B2
(45) Date of Patent: Feb. 22, 2011

(54) KEYBOARD PROCESSING SYSTEM AND METHOD

(75) Inventors: Shoichi Kojima, Hamamatsu (JP); Norihiro Sakai, Hamamatsu (JP)

(73) Assignee: Roland Corporation, Hamamatsu, Shizuoka-ken (JP)

( * ) Notice: Subject to any disclaimer, the term of this patent is extended or adjusted under 35 U.S.C. 154(b) by 137 days.

(21) Appl. No.: 12/060,784

(22) Filed: Apr. 1, 2008

(65) Prior Publication Data
US 2008/0245216 A1 Oct. 9, 2008

(30) Foreign Application Priority Data
Apr. 4, 2007 (JP) ............................ 2007-097965

(51) Int. Cl.
*G10H 1/00* (2006.01)
(52) U.S. Cl. .............................. 84/615; 84/644; 84/653; 84/678; 84/688; 84/720
(58) Field of Classification Search ................ 84/615, 84/617, 618, 644, 653, 655, 656, 678, 682, 84/688, 720
See application file for complete search history.

(56) References Cited

U.S. PATENT DOCUMENTS

| | | | |
|---|---|---|---|
| 5,010,799 A | 4/1991 | Tanaka et al. | |
| 6,362,412 B1 | 3/2002 | Ura | |
| 6,403,872 B2 | 6/2002 | Muramatsu et al. | |
| 7,279,630 B2 * | 10/2007 | Sasaki et al. | 84/723 |
| 7,319,187 B2 | 1/2008 | Sunako | |
| 2005/0211079 A1 * | 9/2005 | Sasaki et al. | 84/723 |
| 2008/0245216 A1 * | 10/2008 | Kojima et al. | 84/688 |

FOREIGN PATENT DOCUMENTS

| | | | |
|---|---|---|---|
| JP | 08044349 A | * | 2/1996 |
| JP | 10-97254 | | 4/1998 |
| JP | 2003-295863 | | 10/2003 |

OTHER PUBLICATIONS www.snoize.com/midimonitor viewed online on Jul. 9, 2010.*

* cited by examiner

*Primary Examiner*—David S. Warren
(74) *Attorney, Agent, or Firm*—Foley & Lardner LLP (57) ABSTRACT

Embodiments of the keyboard system that can determine accurate key operation. The system provides immediate processing of the data input streams from various strike sources, the key stroke depth data, the key strike speed data, the key strike acceleration data. The movement state volume V can be calculated using a formula shown below, based on the key strike depth D, the key speed S, the key acceleration A, the coefficient a, b, c, and constant d. V=a*D+b*S+c*A+d. When the volume level exceeds the predetermined level A, the system determines that the key has been pressed. When it is determined that the key has been pressed, the "note-on" information is outputted to the sound source. The velocity value included in the "note-on" information is calculated with reference to the velocity curve based on the key speed when it is determined that the key has been pressed.

38 Claims, 5 Drawing Sheets

| Temporary memory | | | | | | | |
|---|---|---|---|---|---|---|---|
| Note number | C3 | C#3 | D3 | ...... | A#7 | B7 | C7 |
| Key stroke depth | d 1 | d 2 | d 3 | ...... | d 59 | d 60 | d 61 |
| Key speed | v 1 | v 2 | v 3 | ...... | v 59 | v 60 | v 61 |
| Flag memory | f 1 | f 2 | f 3 | ...... | f 59 | f 60 | f 61 |

4a1 — Key stroke depth
4a2 — Key speed
4a3 — Flag memory

KEYBOARD PROCESSING SYSTEM AND METHOD

CROSS-REFERENCE TO RELATED PATENT APPLICATIONS

Priority is claimed from Japan Priority Application 2007-097965, filed Apr. 4, 2007, including the specification, drawings, claims and abstract, and is incorporated herein by reference in its entirety.

BACKGROUND

Keyboard systems that detect the position of each of a plural keys are known. When a key is pressed in the keyboard systems, the sound production information is transmitted to a sound source. In these keyboards, when a key release is detected, sound production is stopped. In addition, the keyboard systems that continuously detect key speed when a key is pressed are known. The velocity is calculated in the keyboard systems when the key stroke reaches the prescribed depth, based on the fastest key stroke out of all the key stroke speeds. Once the velocity is calculated, the sound output begins to be produced. The sound source generates a sound when the depth of the key reaches a predetermined depth.

SUMMARY OF THE DISCLOSURE

Embodiments of the present invention relate generally to keyboard systems and methods of making and using the same. In particular, embodiments relate to systems and methods that detect key stroke depth, key speed and key acceleration. Specifically they use the key stroke depth, key speed and key acceleration, to determine whether a key has been pressed or released.

Embodiments of the keyboard system can include a conversion means for converting the position of each of a plurality of keys to an electric signal that changes according to the position of each key. Using the converted electrical signal, a key stroke depth detection means can detect a key position relative to time. Using the detected key position, a key speed detection means can detect the speed of the key in relation to time. The key pressing decision means decides whether the key was pressed according to the position detected by the key stroke depth detection means, and the key speed detected by the key speed detection means. When the key pressing decision means determines that a key was pressed, an instruction means outputs the key pressing information. Earlier, electronic keyboards determine a key press based on the key stroke depth. For example, the keyboard does not output key pressing information, unless the key stroke reaches a predetermined depth. Therefore, the output of the key pressing information can be delayed at least until the appropriate key depth is reached. However, in embodiments of the current invention, the key pressing information can be generated based on both the key stroke depth and the key speed. Therefore, the determination regarding whether a key was pressed can occur without reaching a particular key stroke depth. Accordingly, the embodiments of the present invention can output key pressing information quickly and accurately in relation to when the key was pressed.

Another embodiment of the current invention can include a calculation means for calculating the movement state volume relative to time. The calculation means can calculate the movement state volume using the sum of the product of a 1st coefficient with the detected position, and the product of the 2nd coefficient with the key speed. If the calculated movement state volume exceeds a predetermined value, the key pressing decision means determines that the key was pressed, and key pressing information is generated and output. Therefore, a fast key speed, can help the key pressing decision means decide quickly, that the key was pressed and appropriate key pressing information can be generated. The calculation means can calculate the movement state volume using other algorithms. The key pressing decision means can determine that the key was pressed according to other conditions.

Another embodiment of the keyboard system can include a key acceleration detection means for detecting the acceleration of a key based on the electric signal converted by the conversion means. In this example embodiment, key pressing decision means determines that a key was pressed according to the position detected by the key stroke depth detection means, the key speed detected by the key speed detection means, and the key acceleration was detected by the key acceleration detection means. When the key pressing decision means decides that the key was pressed, an instruction means outputs key pressing information. Acceleration can be proportional to the power applied to a key. The keyboard system of one embodiment decides whether a key was pressed based on the key stroke depth, key speed and key acceleration. Therefore, the key pressing decision means can decide quickly and key pressing information can be output. Accordingly, the keyboard system of the above embodiment can output key pressing information more accurately and synchronized with the actual key pressing.

A keyboard system according to embodiments of the current invention can include a calculation means to calculate the movement state volume over time. The movement state volume can be calculated based on the sum of product of the 1st coefficient with the detected position, the product of the 2nd coefficient with the detected key speed and the product of the 3rd coefficient with the detected key acceleration. When the movement state volume calculated by the calculation means exceeds a predetermined value, the key pressing decision means decides that the key was pressed. Therefore, when the key speed is fast, or when key acceleration is large, the key decision means can decide quickly and appropriately that the key was pressed. The calculation means calculates the movement state volume by using a quick arithmetic calculation. The key pressing decision means decides that the key was pressed according to the satisfaction of a condition; for example, the calculated movement state volume exceeded the predetermined value.

A keyboard system according to embodiments of the present invention can output the key speed detected by the key pressing speed detection means using an instruction means, when it is determined that the key was pressed. Accordingly, key pressing information is output showing the key speed. Therefore, the key speed can be effective in the ability to teach a user an appropriate key speed.

In another embodiment of the present invention, a conversion means converts each position of a plurality of keys into an electric signal which changes continuously. Using the converted electric signal, a key stroke depth detection means detects a key position versus time. Based on the electric signal converted by the conversion means, a key acceleration detection means detects the acceleration of a key position versus time. A key pressing decision means determines that the key was pressed according to the position detected by the key stroke depth detection means, and the key acceleration detected by the key acceleration detection means. When the key pressing decision means detects that the key was pressed, an instructions means outputs the key pressing information. Prior art electronic keyboards determined a key press based only on the key stroke depth. For example, the earlier keyboards do not produce or output key pressing information, unless a key is pressed to a predetermined position. Therefore, the output of key pressing information can be delayed in the prior art keyboards. However, in the embodiments of the current invention, the key stroke depth and key acceleration are used to decide that the key was pressed. Therefore, embodiments of the current invention can promptly decide that a key was pressed. Accordingly, the keyboard system of embodiments of the current invention can output key pressing information accurately and synchronized.

A keyboard system according to another embodiment, includes a calculation means to calculate the movement state volume over time. The movement state volume can be calculated based on the sum of the product of the 1st coefficient with the position detected by the key stroke depth detection means, and the product of the 3rd coefficient with the key acceleration detected by the key acceleration detection means. When the movement state volume calculated by the calculation means exceeds a predetermined value, the key pressing decision means determines the key was pressed, and key pressing information is generated and outputted. Therefore, when key acceleration is large, the decision regarding key pressing is made quickly and it is effective in the ability to output key pressing information earlier. The calculation means calculates the movement state volume using a quick arithmetic calculation described above.

Another embodiment of a keyboard system can include a key release decision means. The key release decision means decides whether a key was released, and/or when the movement state volume calculated by the calculation means becomes smaller than a predetermined value. When the key release decision means decides that the key was released, the instructions means outputs key release information. Prior art keyboards use key stroke depth to decide that the key was released. For example, the prior art keyboards include a sensor to determine the key stroke depth when the key is at a shallow position another a sensor to determine when the key is at a deep position. When it was detected that the key was returned to a shallow position, the keyboard system in the prior art decided that the key was released, and key release information was output. Embodiments of the current invention are especially helpful in that when the same key is repeatedly pressed in a short time period, a key may be pressed again before the sensor of a shallow position detects that the key was released. Therefore, the keyboard system of the prior art was not able to process the input appropriately. On the other hand, embodiments of the keyboard system use key stroke depth, key speed or key acceleration, to decide that the key was released. Therefore, the embodiment of the current invention can decide more accurately that the key was released. Accordingly, compared to the prior art, the embodiments of the current invention can output key release information more accurately.

DETAILED DESCRIPTION OF THE DISCLOSURE

Figure 1:
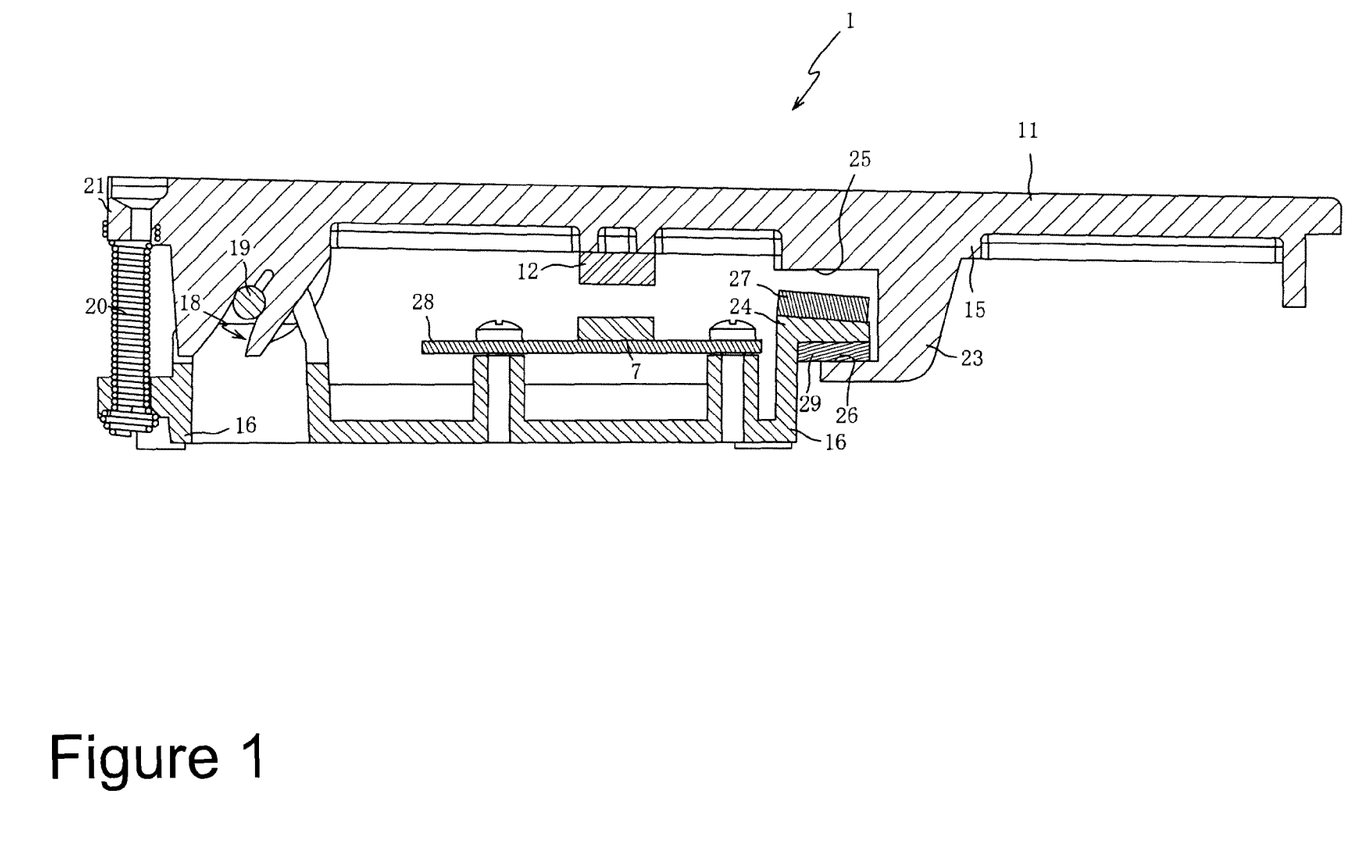
FIG. 1 is a cross-section, side view of a key of a keyboard system according to an embodiment of the present invention.

Embodiments of the present invention are discussed below with reference to illustrations of FIGS. 1-5. FIG. 1 shows a cross-section of an example key on a digital keyboard according to an embodiment of the present invention. The example key can be a white key. A similar key configuration may be employed for keys of other size on the keyboard. The keys of other size can be the black keys. A keyboard according to embodiments of the present invention can include a plurality of white key 11 and a plurality of black keys (not illustrated). The keys as described above can be mounted on a chassis 16. A portion of the chassis 16, but not the whole structure of the chassis 16 is shown in FIG. 1. The chassis 16 can be coupled to a case for the keyboard system 1. FIG. 1 illustrates an example manner in which each white key 11 can be arranged on the chassis 16.

In one example embodiment, the white key 11 can have a pivot surface 18. The pivot surface 18 can pivot around a rod 19. The rod 19 on the chassis 16 can facilitate the pivotal movement of the white key 11 relative to the chassis 16. A bias member 20, such as a spring, is provided to resist the pivotal motion of the white key 11. The bias member 20 may comprise a coil spring member configured to allow a partial drop of the white key unit 11. The bias member 20 can provide a force to cause the return movement of the white key 11 to an un-depressed position, upon release of the depressed white key 11. The force of the bias member 20 can prevent the white key 11 from crashing down upon the application of pressure (as shown in FIG. 1).

The bias member 20 and a washer 21 can be located at the rear portion of the white key 11. The bias member 20 can have a first end and a second end. The first end of the bias member 20 can be coupled to the chassis 16 and the second end of the bias member can be coupled to the washer 21. The washer 21 or the second end of bias member 20 can be coupled to the white key 11. As shown in FIG. 1, a magnet 12 can be located at a central portion of the length dimension of the white key 11. One side of the magnet 12 faces a magnetic sensor 7. The magnetic sensor 7 can be a hall effect sensor. A printed circuit board 28 can be connected to the upper part of the chassis 16.

Near the magnet 12 can be a "C" shaped stroke limiter 23 which, in one non-limiting example, can be formed as an inset portion of the white key 11. The stroke limiter 23 has a downward-facing surface 25 that defines a stop surface for limiting the downward motion of the white key 11 relative to the chassis 16. The stroke limiter 23 has a upward-facing surface 26 that defines the stop surface for controlling the upward motion of the white key unit 11 relative to the chassis 16.

The chassis 16 can have an extension portion 24 that extends into the "C" shaped stroke limiter 23 below the downward-facing surface 25 and above the upward-facing surface 26 of the stroke limiter 23. The surface of the extension portion 24 facing the downward-facing surface 25 may be at least partially covered by a cushioning material 27, such as, but not limited to felt, rubber, or other suitable material. Similarly, the surface of the extension portion 24 facing the upward-facing surface 26 may be at least partially covered by a cushioning material 29, such as, but not limited to felt, rubber, or other suitable material. Alternatively, or in addition, the downward-facing surface 25 and/or the upward-facing surface 26 may be at least partially covered by a cushioning material, such as, but not limited to felt, rubber, or other suitable material.

While an illustration of the black keys is not provided, the black keys may be configured similarly to the white key 11 described herein. The total number of keys (composed of white keys and black keys) on a keyboard may vary among different embodiments of the present invention. In one example embodiment, a total number of 61 keys, both white and black, are attached to the chassis 16.

The magnet 12 can be individually associated with a magnetic sensor 7 and each key can have a pair of the magnet 12 and the magnetic sensor 7. The output terminal of the magnetic sensor 7 can be electrically connected to the printed circuit board 28. The magnetic sensor 7 produces an analog voltage corresponding to an increase in the magnetic field. This analog voltage level is a continuously changing electrical signal. When the white key 11 is held in the resting position, the distance between the magnet 12 and the magnetic sensor 7 can be relatively large, and the analog voltage level can be relatively small. When the white key 11 is depressed, the distance between the magnets 12 and the magnetic sensor 7 reduces and the voltage level of the magnetic sensor 7 changes (for example, the voltage can increase). The voltage level of the magnetic sensor 7 can reach its peak when the stroke of the white key 11 hits the lower limits.

The voltage output by the magnetic sensor 7 can be amplified by a differential amplifier that can be installed on the printed circuit board 28. The electric current from the magnetic sensor 7 will be dependent on the position of the key relative to the chassis. The electrical signal can be sampled at a set time interval (for example, at 0.1, 0.2, 0.5, 0.7 and 1 second). The sampled electrical signal can be converted into a digital signal by a A/D converter 6, as shown in FIG. 2.

Figure 2:
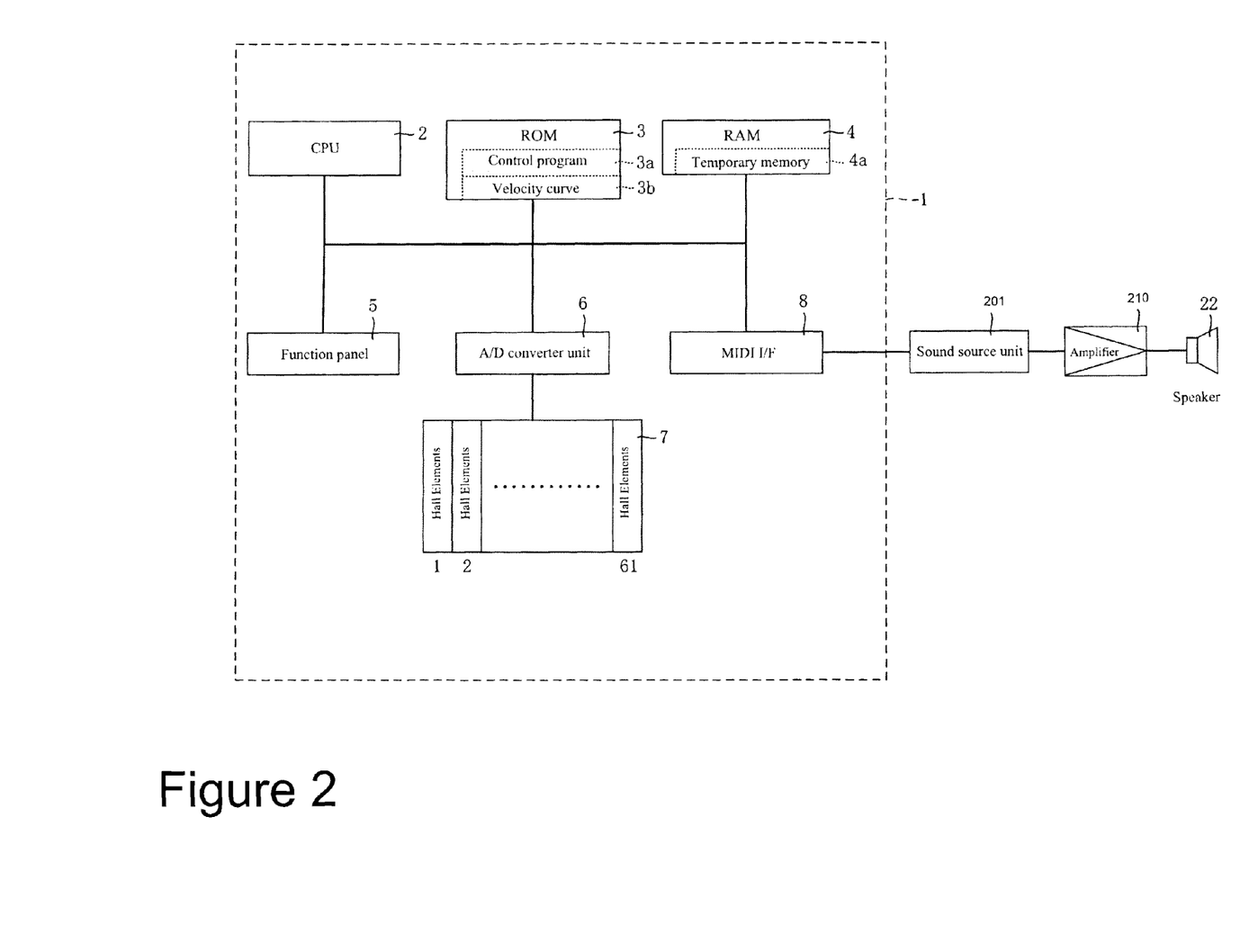
FIG. 2 is a block diagram of a keyboard system, including electrical components thereof, according to an embodiment of the present invention.

FIG. 2 illustrates a block diagram that includes electronic components and electrical communication paths connected on the printed circuit board 28. FIG. 2 shows additional components connected to the keyboard system 1. The keyboard system 1 can have a central processing unit (CPU) 2 and a Read-Only-Memory (ROM) 3 functionally connected to the CPU 2. The ROM 3 may store various programs and data, including a program 3*a*. A Random-Access-Memory (RAM) 4 can be used for functional memory deletion when CPU 2 is running operations and processes associated with the program 3*a*. The keyboard system 1 further includes a sound generation parameter component, a functional panel 5, an A/D converter unit 6, a magnetic sensor 7, and an onboard MIDI information processor and a MIDI interface (I/F) 8. The MIDI interface (I/F) 8 outputs performance information conforming to the MIDI standard.

Figure 5:
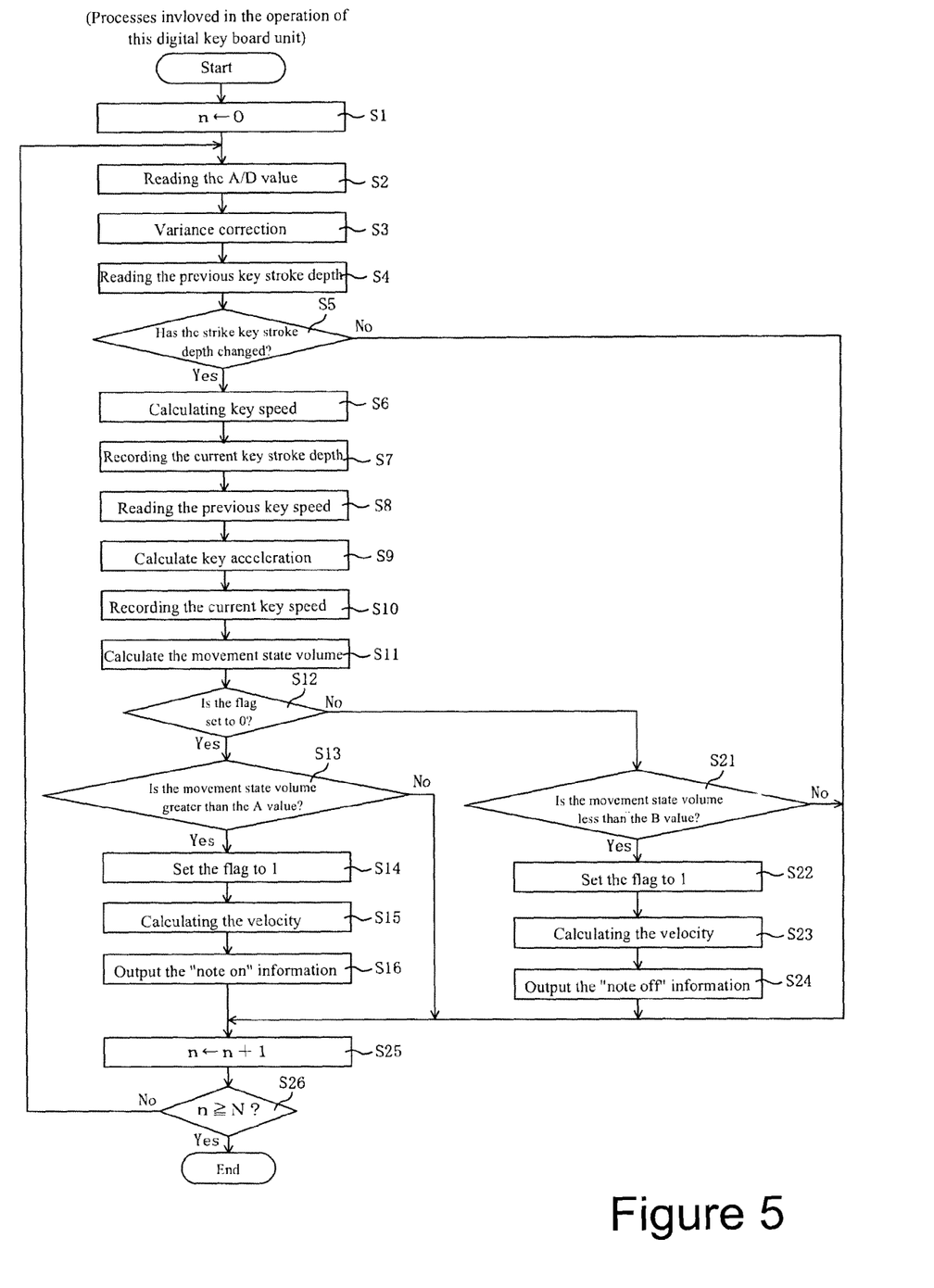
FIG. 5 is a generalized flow chart of a control process, from the first strike to the final audio output according to an embodiment of the present invention.

The control program 3*a* performs the key operation processing as shown in FIG. 5. The velocity curve table 3*b* and various constants, etc. are stored in ROM 3. The velocity curve table 3*b* is used to convert the detected key speed into a velocity. The "note-on" information instructs the sound source 201 to generate the sound. The velocity showing the key stroke speed can be included in the "note-on" information. The velocity which shows the key release speed can be included in the "note-off" information and the note-off information instructs the sound source 201 to stop generating the sound.

Temporary memory 4*a* stores previously entered performance data and can be located within RAM 4. The data stored within the temporary memory area 4*a* of the RAM 4, is illustrated in FIG. 3.

The magnetic sensor 7 that is installed on each key produces an analog voltage signal based on key stroke depth. This voltage value can be sampled at set time intervals and is supplied to the A/D converter 6. In preferred embodiments, each key has a Analog to Digital converter 6. In an alternative embodiment, the A/D converter can be supplied with voltage values one at a time from various magnetic sensors by using an analog switch. The A/D converter 6 receives as input the analog signal and outputs to the CPU 2 a digital signal. Thus the analog electrical signal from the magnetic sensor 7 can be converted from an analog signal into a digital signal. The digital signal is transmitted to the CPU 2 where the signal is read and processed. The MIDI interface (I/F) 8 outputs information on keyboard function conforming to the MIDI standard. The sound unit 20 is connected to the MIDI interface (I/F) 8. The sound output processor 20 receives the performance data information and a data stream from the MIDI interface (I/F) 8 and converts it into sound through speakers 22 or any other output media. From the amplifier 210, the data stream is output through speaker 22.

The data stream produced by the keyboard system 1 can be formatted in the MIDI standard. The data stream flows through the MIDI interface (I/F) 8 to the sound source 201. The musical sound information produced can be called "note-on" information, and information produced when the musical sound is stopped can be referred to as "note-off" information. "Note-on" information includes the status of the information as "note-on" information, the note number of the musical sound and the velocity that can represents the key stroke speed. "Note-off" information can include the status of the information as "note-off" information, the note number of the musical sound and the velocity that represents the key release speed.

Figure 3:
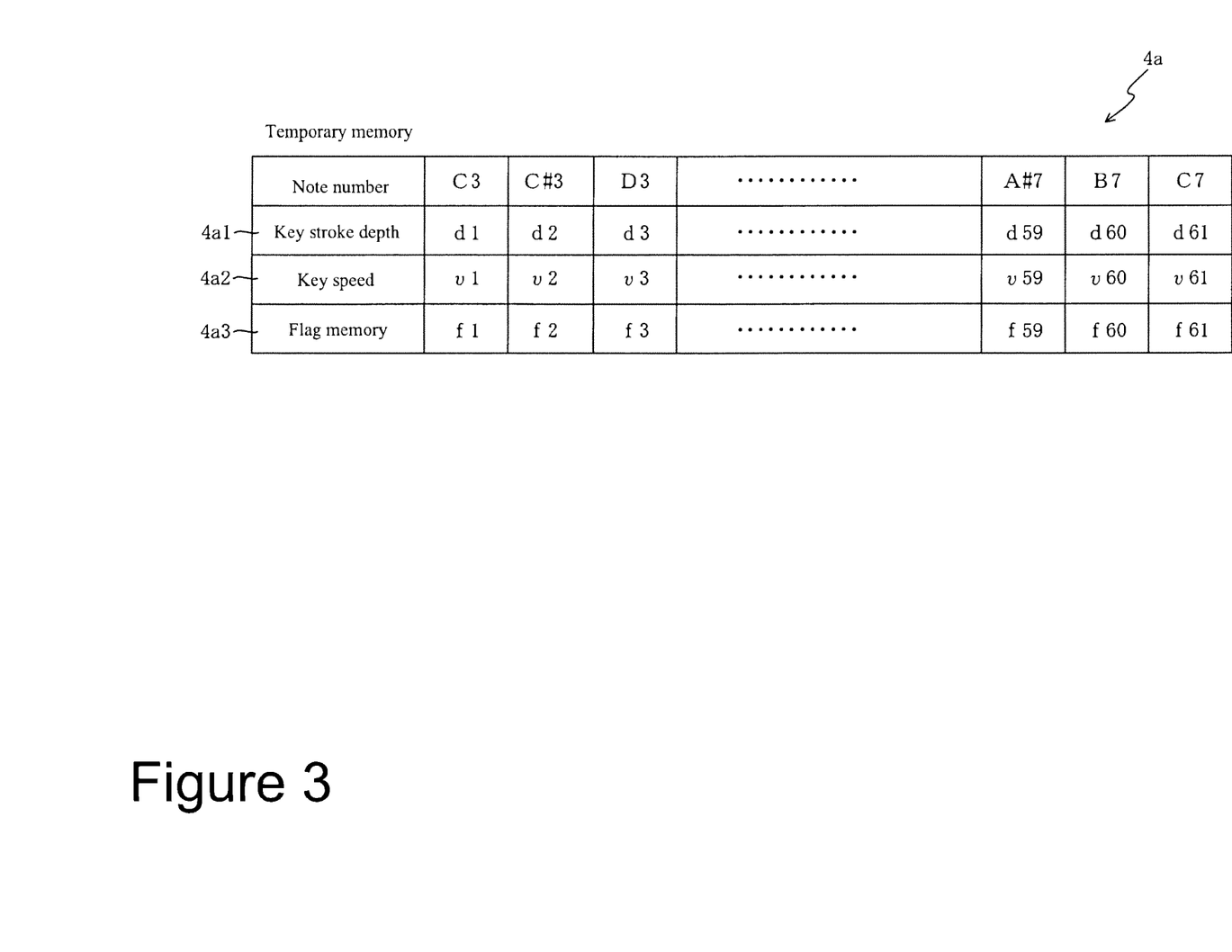
FIG. 3 is a table diagram of a temporary memory system associated with an embodiment of the present invention.

FIG. 3 illustrates an example structure for the information stored in temporary memory 4*a*. Temporary memory 4*a*, contains in part, key stroke depth memory 4*a*1 (d1-d61), key speed memory 4*a*2 (v1-v61) and flag memory 4*a*3 (f1-f61). Key stroke depth memory 4*a*1 can store the key stroke depth. Key speed memory 4*a*2 can store the key speed. Flag memory 4*a*3 can store the flags.

The key stroke depth for each key (d1-d61) can be calculated by converting the voltage from the corresponding magnetic sensor 7. The A/D converter 6 converts the analog voltage generated by the magnetic sensor 7 into a digital voltage. Any quantization errors or other variance in the digital signal created by the each A/D converter can be corrected by the keyboard system. In this manner, the revised key stroke depth is recorded corresponding to the note number of each key to the key stroke depth memory 4*a*1. The new key stroke depth is obtained at every conversion with the A/D converter 6. When the key stroke depth changes, the recorded depth (d1-d61) is rewritten.

The key speed (v1-v61) is calculated using the difference between the current key stroke depth and the key stroke depth (d1-d61) recorded by the key stroke depth memory 4*a*1. The calculated key speed (v1-v61) is recorded corresponding to the note number of each key in the key speed memory 4*a*2. Previously recorded key speed (v1-v61) in the key speed memory 4*a*2 is overwritten.

In an example embodiment, the speed of the key that is struck can be calculated as described herein. For new key stroke information for note number C3, the current key stroke depth and the d1 value recorded for note number C3 in key stroke depth memory 4*a*1 can be compared.

Next, the difference between the key speed v1 recorded for note number C3 in key speed memory 4*a*2 and the current calculated speed is calculated. This difference is the key acceleration. As explained above, given that key speed is calculated at set time intervals, this difference is the change in speed over the interval, and therefore represents the key acceleration. In this way, if key acceleration is calculated, the calculated key speed is overwritten as value v1 corresponding to the recorded location for note number C3 in key speed memory 4a2.

Flag memory 4a3 records flags (f1 to f61) corresponding to the note number of each key. For each key, these flags are set to 1 when a key stroke is detected and are set to 0 when a key release is detected.

Figure 4:
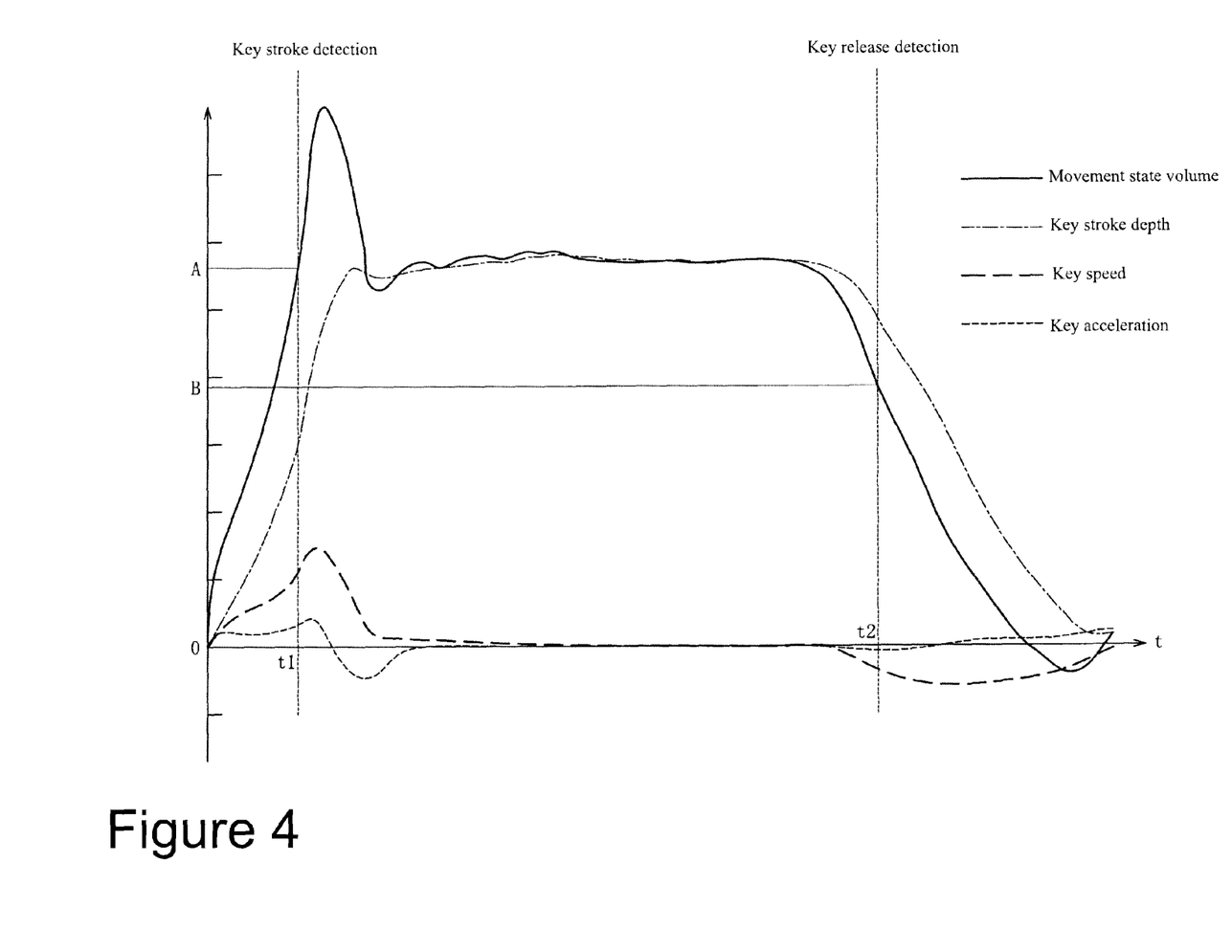
FIG. 4 is a graphical representation of base lines used to measure input from sensors sensing the key stroke depth, key speed, the key acceleration, as well as the final output volume level according to an embodiment of the present invention.

FIG. 4 shows an embodiment of the method of determining a key stroke and key release. FIG. 4 illustrates an example of the graph of the key stroke depth, key speed, key acceleration, and the movement state volume which change over time. In these graphs, the x-axis represents time and the y-axis represents key stroke depth, key speed, key acceleration or the movement state volume. The movement state volume is explained in further detail below.

As discussed above, keyboard system 1 is configured to determine the key stroke depth and key speed for each key at a predetermined time interval. The keyboard system 1 is configured to determine the key acceleration based on the key speed previously recorded in key speed memory 4a2 and the current measured key speed. The key acceleration is calculated by subtracting the key speed previously recorded in key speed memory 4a2 from the current measured key speed. The key speed is calculated by sampling of the key location at the predetermined time interval. Therefore, if we compare the previously measured key stroke depth from the current measured key stroke depth, the difference represents the key speed. Similarly, if we compare the previously calculated key speed from the current calculated key speed, that difference represents key acceleration.

The movement state volume V can be calculated with formula 1 shown below, based on the key strike depth D, the key speed S, the key acceleration A, the coefficient a, b, c, and constant d. V=a*D+b*S+c*A+d (1). The value of the first, second and third coefficient can be determined based on experiments performed on an individual keyboard and/or on characteristics of each key. FIG. 4 shows an example of the graph of the key stroke depth, key speed, key acceleration, and the movement state volume which changes compared time. On this graph, the movement state volume is shown by the thick solid line, and the depth is shown by the dot-dash line. This graph shows the following things, when a key is pressed, the movement state volume becomes a larger value than the key stroke depth, and when a key is released, the movement state volume becomes a value smaller than the key depth.

When the movement state volume level exceeds the point A (time t1) (prescribed level), the determination means determines that a key has been pressed. When it is determined that the key has been pressed, the "note-on" information is output to the sound source 201. The velocity value can be included in the "note-on" information can be calculated with reference to the velocity curve 3b based on key speed when it is determined that the key has been pushed.

When the volume level falls below the point B (time t2) (prescribed level), then it can be determined that the key has been released. When it is determined that the key has been released, the "note-off" information is output to the sound source 201. The velocity value included in this "note-off" information is calculated with reference to the velocity curve 3b based on key speed when it is determined that the key has been released.

FIG. 5 is a flow chart which shows the key operation processing performed by CPU 2. The control of the CPU 2 over the output values generated within keyboard system 1 starts with the activation of the system and can continue until power down of the system. The value "N" is the total number of keys, for example, N equals 61 if there are 61 keys attached to the keyboard system 1. The value "n" is a variable which specifies N keys one by one. Thus if the value of N is 61, then the values of n can be 0 through 60.

In step S1 n is initialized to 0. In step S2, the digital value converted by the A/D converter unit 6 is read. In step S3, the variance in the digital signal can be corrected. The variance can be created by, among other things, difference in distance between the magnet 12 and the magnetic sensor 7 may differ from one key to another key. In addition, the characteristics of the magnetic sensor 7 may differ for each key. Variance due to the differences between one magnetic sensor to another sensor and one magnet to another magnet can be corrected. The revision value for every key is pre-recorded in ROM 3 and this revision value is used for the unevenness revision. The value revised by this revision value corresponds to the key stroke depth. Therefore, the previously measured value is recorded in key stroke depth memory 4a1 as corresponding to key number n. Next, in step S4 the recorded value of the previous key stroke depth is read. In step S5 the recorded value is compared to the next measured key stroke depth and the comparison is used to determine whether there was a change in the key stroke depth.

When the key stroke depth has changed (S5: yes), in step S6, the key speed is calculated. The key speed is calculated by subtracting the key stroke depth recorded in key stroke depth memory 4a1 from the current key stroke depth. As mentioned above, the key stroke depth is a value converted from the sampling of the key location at set time intervals, the difference between the current key stroke depth and the previous key stroke depth is the distance that the key moved over the interval. The distance of the key can be used to calculate the key speed.

In step S7 the control program records the most recent measured key stroke depth at the location for key number "n" in the key stroke depth memory 4a1. In step S8 the control program reads the recorded key speed corresponding to key number n from key speed memory 4a2. In step S9 the key acceleration is calculated. The key acceleration is calculated by subtracting the key speed recorded in key speed memory 4a2 from the current measured key speed. As stated above, the key speed is calculated based on the sampling of key location at set time intervals, by using the difference in key speeds key acceleration can be calculated. In step S10, the most recent calculated key speed is recorded in key speed memory 4a2 corresponding to key number n. Next, the current measured key stroke depth, the current calculated key speed and the current calculated key acceleration are placed into formula 1 and the movement state volume is calculated in step S11.

In step 12 the control program determines whether the flag recorded corresponding to key number n in flag memory 4a3 is set to 0. If the flag is 0, the key located at number n is not pressed and the control program determines whether the volume calculated in S11 is larger than the set level A. The value A is set preliminarily and stored in ROM 3. If the volume becomes greater than the set level A, then the control program determines that a key has been pressed. When the volume is larger than the set level A (S13=YES), the flag recorded corresponding to key number n in flag memory 4a3 is set to 1 in step S14. Subsequently, in step S15 the velocity is calculated based on the recorded key speed corresponding to key number n in key speed memory 4a2 using the velocity curve 3*b*. In step S16 the "note-on" information including the note number of key number n and the acquired velocity value, are output in sound source 201 through the MIDI Interface 8.

If the flag is set to 1 in step S12, then the key corresponding to number n has been pressed. Next a determination is made as to whether the movement state volume calculated in S11 is smaller than the set level B or not (S21). The value B is set beforehand and stored in ROM 3. The value B is smaller than the value A explained above. If the volume becomes less than the set level B, then the control program determines that a key has been released.

When the volume is smaller than the set level B (S21=YES), the flag recorded corresponding to key number n in flag memory 4*a*3 is set to 0 in step S22. Next, the velocity of the key is acquired based on the speed recorded corresponding to key number n in key speed memory 4*a*2, using the velocity curve 3*b* as a reference in step S 23. In step S24 the "note-off" information is created which includes the note number of key number n and the acquired velocity information and it is output to sound source 201 through MIDI Interface 8.

In step S25 1 is added to the value of n. The change in n can occur after steps S16 and S24, if after step S13 the volume is not greater than the set value A (S13=No), or based on the determination in S21, the volume is not smaller than set value B (S21=No), or based on the determination in S5, the key stroke depth has not changed. Next, in step 26 a determination is made as to whether the increased value of n is equal to or more than the total number of keys (N). If n is smaller than N, the control program returns to S2 and if n is equal to or greater than N, the processing of that key is finished.

As explained based on above embodiment, the continuously changing voltage is produced corresponding to the key location based on the magnetic sensor 7. Then, the voltage is continuously converted into a digital value and the result is input into CPU 2. Based on this digital value, key stroke depth, key speed and key acceleration are measured and calculated. Based on these values, the volume is calculated. If the volume exceeds the set value A (preset value), the control process determines that a key has been pressed and "note-on" information is output to sound source 201. If we compare this to the situation where a determination is made on key stroke depth, a more accurate determination can be made when using key stroke depth, key speed and key acceleration. In particular, in the case where a determination is made on the basis of key stroke depth alone, until the key stroke depth reaches the set level, no determination is made and the key pressed detection can be delayed. However, in the above operational situations, key stroke depth, key speed and key acceleration are combined to make a determination and a key stroke determination can therefore be made faster.

If a specific key has been pressed and the output levels fall below the B base line levels, then the control process will determine that the key has been released and "note-off" information is output to sound source 201. Therefore, since the control program determines based on the key stroke depth combining key speed and key acceleration, a more accurate determination can be made compared to when the key release is determined only with the key stroke depth.

In the event the same key is struck repeatedly, it is possible that the key is pressed again before it reaches a key release position. In this case, when making a determination based on key stroke depth, the key release cannot be accurately measured. However, embodiments of the current invention use the key stroke depth, the key speed and the key acceleration to determine the key release, thus more accurate. However, other embodiments of the current invention can use the key stroke depth and the key speed to determine the key release. In yet another embodiment the key stroke depth and the key acceleration can be used to determine the key release.

While the above-discussed features relate to an embodiment of the present invention, it should be understood that aspects and features described above may be modified or changed without departing from the scope of the invention.

For example, in embodiments mentioned above, the keyboard system 1 and the sound source 201 can be connected through the MIDI interface 8. However in yet another embodiments it is possible to connect the keyboard system 1, sound source 201 and CPU 2 through an electronic bus.

In addition, in the above-mentioned embodiment, the position of a key is converted into a voltage by the magnet 12 and the magnetic sensor 7. However, in other embodiment, the key position may be detected by a optical transmitting element and a optical receiving element. In addition, electric capacity may change according to the position of a key.

In embodiments mentioned above, the volume was calculated based on key stroke depth, key speed and key acceleration. However, in alternative embodiments volume can be calculated based on key stroke depth and key speed. In yet other alternative embodiments it is possible to calculate volume based on key stroke depth and key acceleration.

In embodiments mentioned above, the velocity at the time of key press or key release was calculated based on key speed. In another alternative embodiment, the velocity can be calculated at the time of key press or key release based on the volume. In yet other embodiments the velocity can be calculated at the time of key press or key release based on key stroke depth and key speed.

In addition, in the above-mentioned embodiment, when the movement state volume becomes greater than the predetermined value, the control program determines that the key has been pressed, and note-on information is outputted. However, when the movement state volume becomes greater than the predetermined value, the note-on information may be outputted with the key speed and/or key acceleration. Similarly, when the movement state volume becomes smaller than the predetermined value, the note-off information may be outputted with the key speed and/or key acceleration.

In addition, in the above-mentioned embodiment, when the movement state volume becomes greater than the predetermined value, the control program determines that the key was pressed. The predetermined value can be a fixed value stored in ROM 3. However, according to the time interval of the key press and the key release, this predetermined value can be changed. In addition, when the control program detects that the same key is struck continuously in a short time, this predetermined value may be changed. Similarly, when the movement state volume becomes smaller than the predetermined value, the control program determines that the key was released. The predetermined value may be changed according to the time interval of key press and key release. In addition, when the control program detects that the same key is struck continuously in a short time, this predetermined value may be changed. For example, the predetermined value to detect the key press is made small, and the predetermined value to detect the key release is enlarged.

What is claimed is:
1. A keyboard system, comprising:
a plurality of keys arranged to be actuated by a user;
a conversion means for converting a position of a selected key actuated by the user from among the plurality of keys into an electrical signal;

a key stroke depth detection means for detecting the position of the selected key using the electrical signal from the conversion means;

a key speed acquisition means for acquiring a velocity of the selected key;

a calculation means for calculating a first movement state volume using a sum of i) a product of a first coefficient and the detected position of the selected key and ii) a product of a second coefficient and the acquired velocity of the selected key;

a key pressing decision means for deciding whether the first movement state volume of the selected key exceeds a first predetermined value, upon the user actuating the selected key by pressing the selected key; and an output means for outputting key pressing information for the selected key to the user, upon the user actuating the selected key and the key pressing decision means deciding that the first movement state volume of the selected key exceeds the first predetermined value.

2. The keyboard system as recited in claim 1, wherein the key pressing information for the selected key comprises the acquired velocity of the selected key.

3. The keyboard system as recited in claim 1, further comprising:

a key release decision means for deciding whether the first movement state volume of the selected key is less than a second predetermined value, upon the user actuating the selected key by releasing the selected key.

4. The keyboard system as recited in claim 3, the output means configured to output the key pressing information for the selected key to the user after the actuation of the selected key by the user pressing the selected key and before the actuation of the selected key by the user releasing the selected key.

5. The keyboard system as recited in claim 3, the output means configured to output the key release information for the selected key to the user after the actuation of the selected key by the user releasing the selected key and before actuation of a subsequent selected key by the user pressing the subsequent selected key.

6. The keyboard system as recited in claim 1, further comprising:

a key acceleration acquisition means to acquire an acceleration of the selected key based on the electrical signal of the conversion means;

the calculation means for calculating a second movement state volume based on a sum of i) a product of a first coefficient and the detected position of the selected key, ii) a product of a second coefficient and the acquired velocity of the selected key, and iii) a product of a third coefficient and the acquired acceleration of the selected key;

the key pressing decision means for deciding whether the second movement state volume of the selected key exceeds a first predetermined value, upon the user actuating the selected key by pressing the selected key.

7. The keyboard system as recited in claim 6, further comprising:

a key release decision means for deciding whether the second movement state volume of the selected key is less than a second predetermined value, upon the user actuating the selected key by releasing the selected key.

8. The keyboard system as recited in claim 6, wherein the key pressing information for the selected key comprises the acquired velocity of the selected key and the acquired acceleration of the selected key.

9. The keyboard system as recited in claim 6, wherein the second movement state volume equals the sum of i) the product of the first coefficient and the detected position of the selected key, ii) the product of the second coefficient and the acquired velocity of the selected key, and iii) the product of the third coefficient and the acquired acceleration of the selected key.

10. The keyboard system as recited in claim 1, wherein the output means outputs the key pressing information for the selected key in response to a decision by the key pressing decision means that the first movement state volume exceeds the first predetermined value.

11. The keyboard system as recited in claim 1, wherein the output means outputs the key pressing information for the selected key to an electronic sound source.

12. The keyboard system as recited in claim 11, wherein the output means comprises a MIDI interface.

13. The keyboard system as recited in claim 1, further comprising an electronic sound source operatively coupled to the output means to receive the key pressing information for the selected key and to electronically generate sound based at least in part on the key pressing information for the selected key.

14. The keyboard system as recited in claim 1, wherein the output means for outputting the key pressing information for the selected key to the user, upon the user actuating the selected key only if the key pressing decision means decides that the first movement state volume exceeds the first predetermined value.

15. The keyboard system as recited in claim 1, wherein the output means for outputting the key pressing information for the selected key to the user, upon the user actuating the selected key as soon as the key pressing decision means decides that the first movement state volume exceeds the first predetermined value.

16. The keyboard system as recited in claim 1, wherein the output means comprises an image display device for displaying the key pressing information for the selected key.

17. The keyboard system as recited in claim 1, the output means configured to output the key pressing information for the selected key to the user between actuation of the selected key by the user and actuation of a subsequent selected key by the user.

18. The keyboard system as recited in claim 1, the output means configured to not output the key pressing information for the selected key to the user, upon the user actuating the selected key, and the key pressing decision means deciding that the first movement state volume does not exceed the first predetermined value.

19. The keyboard system as recited in claim 1, wherein the plurality of keys are arranged to be actuated by at least one finger of the user.

20. The keyboard system as recited in claim 1, the output configured to not output any information to the user, upon the user actuating the selected key and the key pressing decision means deciding that the first movement state volume does not exceed the first predetermined value.

21. The keyboard system as recited in claim 1, wherein in a case where the selected key is actuated by the user and the key pressing decision means decides that the first movement state volume does not exceed the first predetermined value, the output means does not output the key pressing information for the selected key to the user, in response to the actuation of the selected key by the user.

22. The keyboard system as recited in claim 1, wherein the key pressing information for the selected key is output to the user without further action by the user.

23. The keyboard system as recited in claim 1, wherein the first movement state volume equals the sum of i) the product of the first coefficient and the detected position of the selected key and ii) the product of the second coefficient and the acquired velocity of the selected key.

24. A keyboard system, comprising:
   a plurality of keys arranged to be actuated by a user;
   a conversion means for converting a position of a selected key actuated by the user from among the plurality of keys into an electrical signal;
   a key stroke depth detection means for detecting a position of the selected key using the electrical signal from the conversion means;
   a key acceleration acquisition means for acquiring an acceleration of the selected key;
   a calculation means for calculating a first movement state volume using a sum of i) a product of a first coefficient and the detected position of the selected key and ii) a product of a second coefficient and the acquired acceleration of the selected key;
   a key pressing decision means for deciding whether the first movement state volume of the selected key exceeds a first predetermined value, upon the user actuating the selected key by pressing the selected key; and
   an output means for outputting key pressing information for the selected key to the user, upon the user actuating the selected key and the key pressing decision means deciding that the first movement state volume of the selected key exceeds the first predetermined value.

25. The keyboard as recited in claim 24, wherein the key pressing information for the selected key comprises the acquired acceleration of the selected key.

26. A keyboard system, comprising:
   at least one key configured to be actuated by a user;
   a sensor configured to measure a depth of a selected key actuated by the user from among the at least one key;
   a processor configured to calculate a velocity of the selected key based on the depth of the selected key;
   the processor configured to determine whether a first sum of a product of a first coefficient with the measured depth of the selected key and a product of a second coefficient with the calculated velocity of the selected key exceeds a first predetermined value; and
   the processor configured to output key pressing information for the selected key to the user, upon the user actuating the selected key and the processor determining that the first sum exceeds the first predetermined value.

27. The keyboard system of claim 26, the processor configured to calculate the velocity of the selected key based on a difference between a first measured depth of the selected key and a second measured depth of the selected key to obtain a displacement amount of the selected key and dividing the displacement amount of the selected key by a time interval between the first measured depth and the second measured depth.

28. The keyboard system of claim 27, wherein the processor is configured to calculate an acceleration of the selected key based on the calculated velocity of the selected key.

29. The keyboard system of claim 28, the processor is configured to calculate the acceleration of the selected key based on a difference between a first calculated velocity of the selected key and a second calculated velocity of the selected key to obtain a velocity change of the selected key and dividing the velocity change of the selected key by a time interval between the first calculated velocity and the second calculated velocity.

30. The keyboard system of claim 26, wherein the sensor comprises a magnet and a hall element.

31. The keyboard system of claim 30, wherein the sensor is configured to measure a distance between the magnet and the hall element.

32. The keyboard system as recited in claim 26, further comprising:
   a sound output device to receive the key pressing information for the selected key and to electronically generate sound based at least in part on the key pressing information for the selected key.

33. The keyboard system of claim 28,
   the processor configured to determine whether a second sum of a product of a first coefficient with the measured depth of the selected key, a product of a second coefficient with the calculated velocity of the selected key, and a product of a third coefficient with the calculated acceleration of the selected key exceeds a second predetermined value; and
   the processor configured to output the key pressing information for the selected key to the user, upon the user actuating the selected key and the processor determining that the second sum exceeds the second predetermined value.

34. A method for processing input from a keyboard, comprises:
   providing a plurality of keys for actuation by a user;
   converting a position of a selected key actuated by the user from among the plurality of keys into an electrical signal;
   detecting the position of the selected key using the electrical signal;
   acquiring a velocity of the selected key;
   calculating a first movement state volume using a sum of i) a product of a first coefficient and the detected position of the selected key and ii) a product of a second coefficient and the acquired velocity of the selected key;
   deciding whether the first movement state volume of the selected key exceeds a first predetermined value, upon the user actuating the selected key by pressing the selected key; and
   outputting key pressing information for the selected key to the user, upon the user actuating the key and deciding that the movement state volume of the selected key exceeds the first predetermined value.

35. The method as recited in claim 34, wherein the key pressing information for the selected key comprises the acquired velocity of the selected key.

36. The method as recited in claim 34, further comprising:
   deciding whether the first movement state volume of the selected key is less than a second predetermined value, upon the user actuating the selected key by releasing the selected key; and
   outputting key release information for the selected key to the user, upon the user actuating the selected key and deciding that the movement state volume of the selected key is less than the second predetermined value.

37. The keyboard system as recited in claim 34, further comprising:
   acquiring an acceleration of the selected key;
   calculating a second movement state volume based on a sum of i) a product of a first coefficient and the detected position of the selected key, ii) a product of a second coefficient and the acquired velocity of the selected key, and iii) a product of a third coefficient and the acquired acceleration of the selected key; and deciding whether the second movement state volume of the selected key exceeds a first predetermined value.

38. The keyboard system as recited in claim 37, further comprising:
deciding whether the second movement state volume of the selected key is less than a second predetermined value, upon the user actuating the selected key by releasing the selected key; and outputting key release information for the selected key to the user, upon the user actuating the selected key and deciding that the second movement state volume of the selected key is less than the second predetermined value.

* * * * *